United States Patent

Nagarajan et al.

[11] Patent Number: 5,824,992
[45] Date of Patent: Oct. 20, 1998

[54] METAL-CORE WELD WIRE WITH REDUCED CORE FILL PERCENTAGE

[75] Inventors: Sundaram Nagarajan; Roger A. Daemen, both of Troy, Ohio

[73] Assignee: Illinois Tool Works Inc., Glenview, Ill.

[21] Appl. No.: 665,000

[22] Filed: Jun. 11, 1996

[51] Int. Cl.⁶ .................................................. B23K 35/22
[52] U.S. Cl. .................. 219/145.22; 219/146.23
[58] Field of Search .............. 219/145.22, 137 WM, 219/146.23, 146.24, 146.3, 146.31, 146.32, 146.41

[56] References Cited

U.S. PATENT DOCUMENTS

| | | |
|---|---|---|
| 3,584,187 | 6/1971 | Majetich et al. . |
| 3,656,943 | 4/1972 | Heuschkel . |
| 3,778,587 | 12/1973 | Kubli et al. ........................... 219/146.3 |
| 4,041,274 | 8/1977 | Sadowski ....................... 219/137 WM |
| 4,345,140 | 8/1982 | Godai et al. . |
| 4,587,726 | 5/1986 | Holmgren .......................... 219/145.22 |
| 4,593,174 | 6/1986 | Saito et al. . |
| 4,950,331 | 8/1990 | Pokhodnya et al. . |
| 4,999,479 | 3/1991 | Paton et al. . |
| 5,099,103 | 3/1992 | Yamada et al. . |
| 5,120,931 | 6/1992 | Kotecki et al. . |
| 5,124,529 | 6/1992 | Nishikawa et al. . |
| 5,132,514 | 7/1992 | Chai et al. . |
| 5,192,851 | 3/1993 | James et al. . |
| 5,225,661 | 7/1993 | Chai et al. . |
| 5,233,160 | 8/1993 | Gordish et al. . |
| 5,300,754 | 4/1994 | Gonzalez et al. . |
| 5,313,039 | 4/1994 | Harvey et al. . |
| 5,365,036 | 11/1994 | Crockett et al. . |

FOREIGN PATENT DOCUMENTS

| | | |
|---|---|---|
| 0180976 | 2/1985 | Japan . |
| 6121432 | 4/1988 | Japan . |
| 0046988 | 11/1988 | Japan . |
| 0893833 | 2/1990 | Japan . |
| 858854 | 1/1956 | United Kingdom . |
| 1510120 | 5/1978 | United Kingdom . |

*Primary Examiner*—Clifford C. Shaw
*Attorney, Agent, or Firm*—Mark W. Croll

[57] ABSTRACT

An improved metal-core weld wire, usable for joint and surface welding, having a steel sheath with a core, and a core composition disposed in the core of the steel sheath, wherein the core composition is between approximately 0.001–12.0% total weight of the metal-core wire. The metal-core wires of the present invention have improved manufacturability. In another embodiment, the core composition includes iron powder in an amount that provides an oxygen content less than approximately 600 ppm in the metal-core wire for producing weld deposits with improved impact strength properties.

19 Claims, 1 Drawing Sheet

METAL-CORE WELD WIRE WITH REDUCED CORE FILL PERCENTAGE

BACKGROUND OF THE INVENTION

The invention relates generally to metal-core weld wires usable for joint and surface welding, and more particularly to metal-core wires having improved manufacturability and reduced oxygen content for producing weld deposits with improved impact strength properties.

Metal-core weld wires are generally composite tubular filler metal electrodes having a metal sheath and a core composition of various powdered materials, producing usually no more than slag islands on the face of the weld deposit. As compared to flux-core wires, metal-core wires have a core composition comprising primarily metallic and alloying powders with substantially reduced amounts of fluxing agents, which form slag on the weld deposit. The core composition of metal-core wires also includes iron powder usually as filler material, and the core composition comprises generally between approximately 13–45% of the total wire weight. The iron powder content is usually considerable and comprises generally between approximately 10–41% of the total wire weight. The conventional view has been to provide a substantially constant sheath thickness independent of the amount of the core composition by varying the amount iron powder.

During the manufacture of metal-core wires, the core composition is blended and deposited onto a steel strip, which is formed into a tube, or sheath, about the core composition in a forming mill. The steel sheath surrounding the core composition is then drawn through reducing dies to a specified diameter, and any lubricants accumulated onto the exterior of the wire are removed in a baking process. Baking is usually a desirable step because unbaked wire tends to produce weld deposits with increased blow hole formation and porosity, particularly in welding operations shielded by high percentages of argon gas. Some applications, nevertheless, do not require baked wire.

Metal-core wires are used increasingly as an alternative to solid weld wires for improved productivity in structural fabrication. More specifically, metal-core wires have increased weld deposition rates and produce wider, more consistent penetration profiles than solid wires. In addition, metal-core wires generate less fumes and spatter, provide improved arc stability and produce weld deposits with an improved wetting characteristic in comparison to solid wires. Metal-core wires tend, however, to produce a relatively high oxygen content weld deposit, which is directly related to weld deposit inclusion, or impurity, population density. Oxygen in the weld pool tends to form oxides, which weaken the weld deposit and adversely affect weld deposit impact strength properties. Metal-core wires therefore produce weld deposits with relatively low impact toughness in comparison to solid wire weld deposits.

The relatively high oxygen content in metal-core wire weld deposits has been attributed to oxidizing processes occurring on the exterior of the metal-core wire and to highly oxidizing agents like manganese and silicon in the weld pool. It was commonly understood that oxidation did not occur in the wire core, which was sealed. The inventors of the present invention recognize, however, that the oxygen content in metal-core wire weld deposits is attributable to the raw materials of the metal-core wire. More specifically, that wire oxygen content is attributable largely to the iron powder, which usually constitutes a large proportion of the core composition. The inventors recognize also that the wire oxygen content is significantly increased during baking, and moreover that the wire oxygen content is attributable largely to oxidation of iron powder within the core composition.

The inventors recognize further that the oxygen content of metal-core wire weld deposits is affected by the oxidation potential of the shielding gas, which is proportional to the amount of oxidizing gas present in the shielding gas. The inventors recognize also that the shielding gas increasingly affects the weld deposit oxygen content as the metal-core wire oxygen content decreases, particularly when the metal-core wire oxygen content is below 400 ppm.

In view of the discussion above, there exists a demonstrated need for an advancement in the art of metal-core weld wires.

It is therefore an object of the invention to provide a novel metal core wire and a method for making the same that overcomes problems in the prior art.

It is also an object of the invention to provide a novel method and composition for a metal-core wire usable for joint and surface welding.

It is another object of the invention to provide a novel metal-core wire with improved manufacturability.

It is a further object of the invention to provide a novel metal-core wire with a relatively reduced oxygen content that provides a metal-core wire weld deposit with improved impact strength properties.

These and other objects, features and advantages of the present invention will become more fully apparent upon consideration of the following Detailed Description of the Invention with the accompanying drawings, which may be disproportionate for ease of understanding, wherein like structure and steps are referenced by corresponding numerals and indicators.

DETAILED DESCRIPTION OF THE INVENTION

Figure 1:
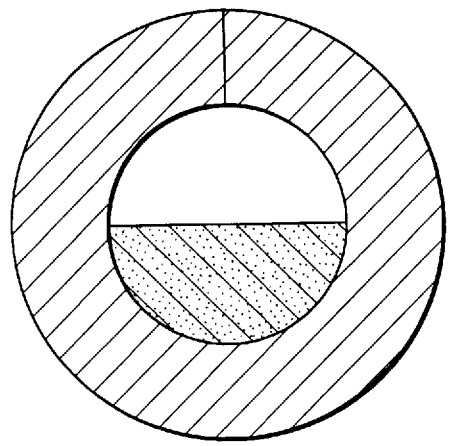
FIG. 1 is a sectional view of a metal-core wire illustrating the proportion of the core area filled with core composition before wire drawing according to an exemplary embodiment of the invention.

The metal-core wire of the present invention includes a steel sheath with a core, and a core composition disposed in the core of the steel sheath. According to the present invention, the core composition is generally between approximately 0.001–12.0% total weight of the metal-core wire, and in alternative embodiments the core composition is between approximately 2.5–6.0% total weight of the metal-core wire.

According to one aspect of the invention, the metal-core wire has an oxygen content less than approximately 600 ppm, and in an alternative embodiment an oxygen content less than approximately 400 ppm. As discussed above, the inventors identified iron powder as a significant source of wire oxygen. In one embodiment, therefore, the wire oxygen content is controlled by controlling the amount of iron powder in the core composition. Generally, the wire oxygen content is reduced by reducing the amount of iron powder in the core composition.

In another embodiment, the wire oxygen content is controlled by using low oxygen core composition constituents, particularly low oxygen iron powder, which often constitutes, by weight, a large proportion of metal-core wires. High purity metallic and non-metallic constituents usable in the core composition have generally low oxygen. A low oxygen iron powder is available commercially as "Atomet 1011HP™" from Quebec Metal Powders. This low oxygen iron has an oxygen content of approximately 400 ppm in comparison to standard iron powder, which has an oxygen content of approximately 2200 ppm. Other low oxygen constituents of the core composition may also contribute to reduced wire oxygen content, generally in proportion to the amount of the constituent in the wire.

In baked wires, the oxygen content tends to increase substantially during baking independent of whether the core composition includes a low oxygen iron powder. The wire oxygen content in baked wire is controlled by reducing iron powder in the core composition, or by baking the wire in a substantially inert atmosphere of argon, or helium, or a combination thereof. Alternatively, the baking atmosphere may be substantially evacuated to reduce oxidation of the wire during baking.

A uniform distribution of the core composition in the drawn metal-core wire ensures uniformity of the weld deposit, and in particular uniformity of weld deposit properties including impact strength. According to the invention, shifting of the core composition during wire drawing is substantially eliminated by filling at least a minimum cross-sectional area of the sheath core, along the length of the wire, with the core composition before wire drawing.

FIG. 1 is a cross-sectional view of a metal-core wire that illustrates the area fill percentage of the core after the sheath is formed about the core composition and before wire drawing. The steel sheath is sealed with a butt seam, or overlap seam, or other seam known in the art. In one embodiment, the percent area of the core filled before drawing is at least approximately 40% to ensure a substantially uniform distribution of core composition along the wire length, and to eliminate substantially shifting of the core composition during the drawing process. In another embodiment, the percent area of the core filled before drawing is between approximately 50–70% of the sheath core. In FIG. 1, the core composition fills approximately 50.9% of the sheath core area along the wire length. To obtain the desired sheath core fill percentage, the sectional area of the sheath core is properly sized by varying the width and thickness dimensions of the steel strip, which is formed into the steel sheath about the core composition. According to the present invention, the reduced core composition weight percentage range between approximately 0.001–12.0% corresponds to reduced sheath core sectional areas, which correspond to increased sheath thicknesses for a given wire diameter.

The relatively increased sheath thicknesses resulting from the reduced core fill percentages of the present invention provide several manufacturing advantages. Namely, increased sheath thickness has greater strength, and is less likely to break during wire drawing. Increased sheath thickness also permits use of thicker steel strip stock, which is less costly than thinner strip stock. In addition, reducing the weight amount of core composition deposited into the sheath core has the advantage of increasing the rate of wire production. More specifically, the feed rate of the steel strip, that forms the sheath about the core composition, toward the core filling station may be increased in proportion to the decreased amount of core composition deposited into the core.

The objects, features and advantages of the invention are applicable to all types of metal-core wires including low carbon metal-core wires, stainless steel metal-core wires, low alloy metal-core wires, and others.

Low carbon metal-core wires have generally the following wire composition, between the approximate ranges, by total weight of the wire,

| Wire | Embodiment 1 | Embodiment 2 |
| --- | --- | --- |
| C | 0.005–0.150% | 0.005–0.040% |
| Mn | 0.5–2.5% | 1.4–1.8% |
| Si | 0.2–1.2% | 0.8–1.2% |
| Ti | 0.001–0.100% | — |
| B | 0.0001–0.0200% | — |
| O$_2$ (ppm) | 100–500 | 200–400 |
| Fe | Balance | Balance | wherein the core composition includes, between the approximate ranges, by total weight of the wire,

| Core | Embodiment 1 | Embodiment 2 |
| --- | --- | --- |
| Mn | 0.1–2.5% | 1.40–1.80% |
| Si | 0.2–2.0% | 0.8–1.2% |
| Ti | 0.001–0.100% | — |
| B | 0.0001–0.0200% | — |
| Fe | 0.2–10.0% | 1.5–2.5% |
| Fill percentage | 0.001–12% | 2.5–6.0% | and the steel sheath includes, between the approximate ranges, by total weight of the wire,

| Sheath | Embodiment 1 | Embodiment 2 |
| --- | --- | --- |
| C | 0.005–0.150% | 0.005–0.040% |
| Mn | 0.1–1.1% | 0.2–0.4% |
| Ti | 0.001–0.100% | — |
| B | 0.0001–0.0200% | — |
| Fe | Balance | Balance |

Stainless steel metal-core wires have generally the following wire composition, between the approximate ranges, by total weight of the wire,

| Wire | Embodiment 1 | Embodiment 2 |
| --- | --- | --- |
| C | 0.01–0.30% | 0.02–0.04% |
| Mn | 1.0–4.0% | 1.5–2.5% |
| Si | 0.3–2.5% | 0.1–0.5% |
| Cr | 16.0–30.0% | 18.0–20.0% |
| Ni | 6.0–25.0% | 11.5–13.5% |
| Ti | 0.001–2.500% | — |
| Mo | 0.05–8.0% | 2.0–3.0% |
| O$_2$ (ppm) | 100–500 | 200–400 |
| Fe | Balance | Balance | wherein the core composition includes, between the approximate ranges, by total weight of the wire,

| Core | Embodiment 1 | Embodiment 2 |
| --- | --- | --- |
| Mn | 1.0–2.0% | 0.4–0.8% |
| Si | 0.3–2.5% | 0.1–0.3% |
| Cr | 0.01–15.0% | 2.0–2.6% |
| Ni | 0.01–17.0% | 3.0–3.8% |
| Mo | 0.01–8.0% | 2.0–2.6% |
| Fe | 0.2–10.2% | 0.2–2.2% |
| Fill percentage | 0.001–12% | 9.0–11.0% | and the steel sheath includes, between the approximate ranges, by total weight of the wire,

| Sheath | Embodiment 1 | Embodiment 2 |
|---|---|---|
| C | 0.01–0.30% | 0.005–0.030% |
| Mn | 1.0–2.0% | 0.8–1.4% |
| Cr | 15.0–20.0% | 13.0–14.5% |
| Ni | 8.0–12.0% | 7.0–8.2% |
| Fe | Balance | Balance |

Low alloy metal-core wires have generally the following wire composition, between the approximate ranges, by total weight of the wire,

| Wire | Embodiment 1 | Embodiment 2 |
|---|---|---|
| C | 0.005–0.15% | 0.07–0.10% |
| Mn | 0.5–2.5% | 1.00–1.30% |
| Si | 0.2–1.2% | 0.40–0.80% |
| Cr | 0.01–9.0% | — |
| Ni | 0.01–9.0% | 3.00–3.30% |
| Ti | 0.001–0.100% | — |
| Mo | 0.01 5.0% | — |
| B | 0.0001–0.0200% | — |
| $O_2$ (ppm) | 100–500 | 200–400 |
| Fe | Balance | Balance | wherein the core composition includes, between the approximate ranges, by total weight of the wire,

| Core | Embodiment 1 | Embodiment 2 |
|---|---|---|
| C | 0.005–0.030% | 0.015–0.045% |
| Mn | 0.5–2.5% | 0.50–0.80% |
| Si | 0.2–1.2% | 0.50–0.70% |
| Cr | 0.01–9.0% | — |
| Ni | 0.01–9.0% | 3.0–3.3% |
| Ti | 0.001–0.100% | — |
| Mo | 0.01–5.0% | — |
| B | 0.001–0.020% | — |
| Fe | 0.1–10.0% | 1.0–2.0% |
| Fill percentage | 0.001–12% | 2.5–6.0% | and the steel sheath includes, between the approximate ranges, by total weight of the wire,

| Sheath | Embodiment 1 | Embodiment 2 |
|---|---|---|
| C | 0.005–0.15% | 0.03–0.05% |
| Mn | 0.2–1.5% | 0.2–0.6% |
| Fe | Balance | Balance |

EXAMPLE 1

The composition of a low carbon metal-core wire according to the invention is compared to a prior art low carbon metal-core wire.

The low carbon metal-core wires have the following wire composition, by total weight of the wire,

| Wire | Invention | Prior Art |
|---|---|---|
| C | 0.022% | 0.020% |
| Mn | 1.6% | 1.9% |
| Si | 1.0% | 1.1% |
| $O_2$ | 300 ppm | 1050 ppm |
| Fe | Balance | Balance | wherein the core composition is, by total weight of the wire,

| Core | Invention | Prior Art |
|---|---|---|
| Mn | 1.6% | 1.6% |
| Si | 1.0% | 1.0% |
| Fe | 2.5% | 15.5% |
| Fill percentage | 5% | 18% | and the steel sheath composition is, by total weight of the wire,

| Sheath | Invention | Prior Art |
|---|---|---|
| C | 0.020% | 0.020% |
| Mn | 0.3% | 0.3%, |
| Fe | Balance | Balance |

Below is a comparison of weld deposit chemistries and properties produced by low carbon metal-core wires according to the invention and the prior art for several different shielding gas mixtures.

| | Weld Deposit | | | | |
|---|---|---|---|---|---|
| | 75/25 $Ar/CO_2$ | 90/10 $Ar/CO_2$ | 95/5 $Ar/CO_2$ | 98/2 $Ar/O_2$ | 100 Ar |
| "Weld Deposit Produced by a Metal-Core Wire According to Present Invention" | | | | | |
| C | 0.036% | 0.034% | 0.030% | 0.027% | 0.024% |
| Mn | 1.50% | 1.56% | 1.64% | 1.61% | 1.73% |
| Si | 0.85% | 0.91% | 0.96% | 0.94% | 0.85% |
| $O_2$ (ppm) | 911 | 425 | 455 | 397 | 217 |
| $N_2$ (ppm) | 44 | 33 | 54 | 50 | 80 |
| CVN 32° F. | — | — | — | 90.7 ft-lb | — |
| CVN 0° F. | — | — | — | 69.4 ft-lb | — |
| CVN −20° F. | — | — | — | 67.7 ft-lb | — |
| CVN −40° F. | — | — | — | 50.2 ft-lb | — |
| CVN −60° F. | — | — | — | 32.0 ft-lb | — |
| "Weld Deposit Produced by a Prior Art Metal-Core Wire" | | | | | |
| C | 0.020% | 0.018% | 0.016% | 0.015% | 0.016% |
| Mn | 1.82% | 1.83% | 1.87% | 1.92% | 1.90% |
| Si | 0.99% | 0.99% | 1.02% | 1.06% | 1.05% |
| $O_2$ (ppm) | 1050 | 636 | 761 | 837 | 494 |
| $N_2$ (ppm) | 41 | 50 | 47 | 94 | 62 |
| CVN 32° F. | — | — | — | 69.0 ft-lb | — |
| CVN 0° F. | — | — | — | 51.0 ft-lb | — |
| CVN −20° F. | — | — | — | 35.3 ft-lb | — |
| CVN −40° F. | — | — | — | 30.7 ft-lb | — |
| CVN −60° F. | — | — | — | 18.0 ft-lb | — |

EXAMPLE 2

The composition of an exemplary austenitic, ferritic, martensitic and precipitation hardened stainless steel metal-core wire according to the invention is compared to a prior art stainless steel metal-core wire.

The stainless steel metal-core wires have the following wire composition, by total weight of the wire,

| Wire | Invention | Prior Art |
|---|---|---|
| C | 0.040% | 0.040% |
| Mn | 2.0% | 2.0% |
| Si | 0.2% | 0.2% |
| Cr | 19.0% | 19.0% |
| Ni | 12.6% | 12.5% |

-continued

| Wire | Invention | Prior Art |
| --- | --- | --- |
| Mo | 2.3% | 2.0% |
| O$_2$ (ppm) | 300 | 1050 |
| Fe | Balance | Balance | wherein the core composition is, by total weight of the wire,

| Core | Invention | Prior Art |
| --- | --- | --- |
| Mn | 0.6% | 0.8% |
| Si | 0.2% | 0.2% |
| Cr | 2.3% | 5.2% |
| Ni | 3.4% | 5.0% |
| Mo | 2.3% | 2.3% |
| Fe | 1.2% | 12.5% |
| Fill percentage | 10% | 26% | and the steel sheath composition is, by total weight of the wire,

| Sheath | Invention | Prior Art |
| --- | --- | --- |
| C | 0.015% | 0.015% |
| Mn | 1.1% | 1.4% |
| Cr | 13.7% | 16.7% |
| Ni | 7.6% | 9.2% |
| Fe | Balance | Balance |

EXAMPLE 3

The composition of an alternative exemplary austenitic, ferritic, martensitic and precipitation hardened stainless steel metal-core wire according to the invention is compared to a prior art stainless steel metal-core wire.

The stainless steel metal-core wires have the following wire composition, by total weight of the wire,

| Wire | Invention | Prior Art |
| --- | --- | --- |
| C | 0.040% | 0.040% |
| Mn | 0.5% | 0.5% |
| Si | 0.4% | 0.4% |
| Cr | 17.0% | 17.0% |
| Ni | 4.0% | 4.0% |
| Ti | 1.0% | 1.0% |
| O$_2$ (ppm) | 300 | 1050 |
| Fe | Balance | Balance | wherein the core composition is, by total weight of the wire,

| Core | Invention | Prior Art |
| --- | --- | --- |
| Mn | 0.15% | 0.4% |
| Cr | 0.75% | 17.2% |
| Ni | 4.15% | 4.10% |
| Ti | 1.0% | 1.0% |
| Fe | 1.9% | 0.02% |
| Fill percentage | 10% | 23% | and the steel sheath composition is, by total weight of the wire,

| Sheath | Invention | Prior Art |
| --- | --- | --- |
| C | 0.04% | 0.03% |
| Mn | 0.5% | 0.25% |
| Si | 0.3% | 0.005% |
| Cr | 16.4% | 0.005% |
| Fe | Balance | Balance |

EXAMPLE 4

The composition of a low alloy metal-core wire according to the invention is compared to a prior art low alloy metal-core wire.

The low alloy metal-core wires have the following wire composition, by total weight of the wire,

| Wire | Invention | Prior Art |
| --- | --- | --- |
| C | 0.085% | 0.08% |
| Mn | 1.15% | 1.20% |
| Si | 0.60% | 0.50% |
| Ni | 3.15% | 3.00% |
| O$_2$ (ppm) | 300 | 1050 |
| Fe | Balance | Balance | wherein the core composition is, by total weight of the wire,

| Core | Invention | Prior Art |
| --- | --- | --- |
| C | 0.035% | 0.04% |
| Mn | 0.65% | 0.75% |
| Si | 0.60% | 0.60% |
| Ni | 3.15% | 3.15% |
| Fe | 1.5% | 13.5% |
| Fill percentage | 6% | 18% | and the steel sheath composition is, by total weight of the wire,

| Sheath | Invention | Prior Art |
| --- | --- | --- |
| C | 0.05% | 0.04% |
| Mn | 0.50% | 0.45% |
| Si | 0.001% | 0.001% |
| Ni | 0.001% | 0.001% |
| Fe | Balance | Balance |

While the foregoing written description of the invention enables anyone skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A metal-core weld wire for producing weld deposits with improved impact strength properties, the metal-core wire comprising:
   a steel sheath with a core;
   a core composition disposed in the core of the steel sheath, the core composition between approximately 0.001–9.0% total weight of the metal-core wire,
   wherein the core composition includes iron powder in an amount that provides an oxygen content less than approximately 600 ppm in the metal-core wire.

2. The metal-core wire of claim 1 wherein the metal-core wire is a baked metal-core wire, the core composition is between approximately 2.5–6.0% total weight of the metal-core wire, and the core composition includes iron powder in an amount that provides an oxygen content less than approximately 400 ppm in the metal-core wire after baking.

3. The metal-core wire of claim 1 wherein the metal-core wire is an unbaked metal-core wire, the core composition is between approximately 2.5–6.0% total weight of the metal-core wire, and the core composition includes iron powder in an amount that provides an oxygen content less than approximately 400 ppm in the metal-core wire.

4. The metal-core wire of claim 1 wherein the metal-core wire is an unbaked wire and the core composition includes a low oxygen core composition constituents.

5. The metal-core wire of claim 1 wherein the core composition fills at least approximately 40% of a steel sheath core area before wire drawing.

6. The metal-core wire of claim 1 further comprising, by weight, between approximately,

| | |
|---|---|
| C | 0.005–0.150%; |
| Mn | 0.50–2.5%, |
| Si | 0.20–1.2%, and | wherein the core composition is, by total weight of the metal-core wire, between approximately 2.5–6.0%, and the core composition includes iron powder in an amount that provides an oxygen content less than approximately 400 ppm in the metal-core wire.

7. The metal-core wire of claim 1 further comprising, by weight, between approximately,

| | |
|---|---|
| C | 0.01–0.30%, |
| Mn | 1.0–4.0%, |
| Si | 0.3–2.5%, |
| Cr | 16.0–30.0%, |
| Ni | 6.0–25.0%, and |
| Mo | 0.05–8.0%, | wherein the core composition is, by total weight of the metal-core wire, between approximately 9–11%, and the core composition includes iron powder in an amount that provides an oxygen content less than approximately 400 ppm in the metal-core wire.

8. The metal-core wire of claim 1 further comprising, by weight, between approximately,

| | |
|---|---|
| C | 0.01–0.30%, |
| Mn | 1.0–4.0%, |
| Si | 0.3–2.5%, |
| Cr | 16.0–30.0%, |
| Ni | 6.0–25.0%, and |
| Ti | 0.001–2.5%, | wherein the core composition is, by total weight of the metal-core wire, between approximately 9–11%, and the core composition includes iron powder in an amount that provides an oxygen content less than approximately 400 ppm in the metal-core wire.

9. The metal-core wire of claim 1 further comprising, by weight, between approximately,

| | |
|---|---|
| C | 0.005–0.15%, |
| Mn | 0.5–2.5%, |
| Si | 0.2–1.2%, and | one or more elements selected from the group consisting essentially of Cr, Ni, Ti, Mo, and B, wherein the core composition is, by total weight of the metal-core wire, between approximately 2.5–6.0%, and the core composition includes iron powder in an amount that provides an oxygen content less than approximately 400 ppm in the metal-core wire.

10. A method of making an improved metal-core weld wire, the method comprising steps of:

forming a steel sheath about a core composition, the core composition between approximately 0.001–12.0% total weight of the metal-core wire;

filling approximately 40–70% of a steel sheath core area with the core composition before drawing; and drawing the metal-core wire with approximately 40–70% of the steel sheath core area filled with the core composition to reduce a diameter of the metal-core wire.

11. The method of claim 10 wherein the step of forming the sheath about the core composition includes a step of adding iron powder in an amount that provides an oxygen content less than approximately 600 ppm in the metal-core wire deposits wherein the metal-core wire provides weld deposits with improved impact strength properties.

12. The method of claim 11 further comprising a step of baking the metal-core wire to remove any contaminants from an exterior surface of the metal-core wire, wherein the core composition is between approximately 4.0–6.0% total weight of the metal-core wire, and the core composition includes iron powder in an amount that provides an oxygen content less than approximately 400 ppm in the metal-core wire after baking.

13. The method of claim 12 wherein the step of baking includes a step of baking the metal core wire in a substantially inert atmosphere.

14. An improved baked metal-core weld wire comprising:

a steel sheath with a core; and a core composition disposed in the core of the steel sheath, the core composition between approximately 0.001–9.0% total weight of the metal-core wire.

15. The metal-core wire of claim 14 wherein the core composition fills between approximately 40% and approximately 70% of a steel sheath core area before wire drawing.

16. An improved metal-core weld wire comprising:

a steel sheath with a core;

by weight, between approximately,

| | |
|---|---|
| C | 0.005–0.150%, |
| Mn | 0.50–2.5%, |
| Si | 0.20–1.2%; and | a core composition disposed in the core of the steel sheath, the core composition includes iron powder, and the core composition is, by total weight of the metal-core wire, between approximately 2.5–6.0%.

17. An improved metal-core weld wire comprising:

a steel sheath with a core;

by weight, between approximately,

| | |
|---|---|
| C | 0.01–0.30%, |
| Mn | 1.0–4.0%, |
| Si | 0.3–2.5%, |
| Cr | 16.0–30.0%, |
| Ni | 6.0–25.0%, |
| Mo | 0.05–8.0%; and | a core composition disposed in the core of the steel sheath the core composition includes iron powder, and the core composition is, by total weight of the metal-core wire, between approximately 9–11%.

18. An improved metal-core weld wire comprising:

a steel sheath with a core;

by weight, between approximately,

| | |
|---|---|
| C | 0.01–0.30%, |
| Mn | 1.0–4.0%, |
| Si | 0.3–2.5%, |
| Cr | 16.0–30.0%, |
| Ni | 6.0–25.0%, |
| Ti | 0.001–2.5%; and | a core composition disposed in the core of the steel sheath, the core composition includes iron powder, and the core composition is, by total weight of the metal-core wire, between approximately 9–11%.

19. An improved metal-core weld wire comprising:

a steel sheath with a core;

by weight, between approximately,

| | |
|---|---|
| C | 0.005–0.15%, |
| Mn | 0.5–2.5%, |
| Si | 0.2–1.2%, | one or more elements selected from the group consisting essentially of Cr, Ni, Ti, Mo, and B; and a core composition disposed in the core of the steel sheath, the core composition includes iron powder, and the core composition is, by total weight of the metal-core wire, between approximately 2.5–6.0%.

* * * * *